United States Patent
Nieman et al.

(10) Patent No.: US 6,923,058 B2
(45) Date of Patent: Aug. 2, 2005

(54) SYSTEM AND METHOD FOR BALANCING A DRIVELINE SYSTEM

(75) Inventors: Andrew L. Nieman, Lambertville, MI (US); Kerry Shannon, Fort Wayne, IN (US)

(73) Assignee: Torque-Traction Technologies, Inc, Holland, OH (US)

( * ) Notice: Subject to any disclaimer, the term of this patent is extended or adjusted under 35 U.S.C. 154(b) by 0 days.

(21) Appl. No.: 10/438,026

(22) Filed: May 15, 2003

(65) Prior Publication Data

US 2004/0226368 A1 Nov. 18, 2004

(51) Int. Cl.$^7$ ................................................ G01M 1/32
(52) U.S. Cl. ........................... 73/462; 29/901; 464/180
(58) Field of Search ........................... 73/462, 66, 460; 29/901; 464/180

(56) References Cited

U.S. PATENT DOCUMENTS

| | | | |
|---|---|---|---|
| 4,302,966 A | * 12/1981 | Ohnishi et al. | ................. 73/66 |
| 4,646,570 A | 3/1987 | Schoenfeld | ................. 73/462 |
| 4,817,003 A | 3/1989 | Nagase et al. | ................. 73/462 |
| 5,172,325 A | 12/1992 | Heidari | ................. 73/462 |
| 5,203,740 A | 4/1993 | Okuzumi et al. | |
| 5,208,758 A | 5/1993 | Okumura | ................. 73/462 |
| 5,431,049 A | 7/1995 | Kopp | |
| 5,877,420 A | 3/1999 | Moradi et al. | ................. 73/462 |
| 5,979,237 A | 11/1999 | Spaggiari | ................. 73/462 |
| 6,123,623 A | 9/2000 | Sugiyama | ................. 464/180 |
| 6,189,372 B1 | 2/2001 | Danz | ................. 73/66 |
| 6,691,573 B2 * | 2/2004 | Silvagi et al. | ................. 73/462 |

FOREIGN PATENT DOCUMENTS

DE           41 20 197 A       12/1992

* cited by examiner

Primary Examiner—John E. Chapman
(74) Attorney, Agent, or Firm—Berenato, White & Stavish

(57) ABSTRACT

A process for balancing a vehicular driveline including a propeller shaft and an input shaft of a vehicle axle interconnected by a universal joint. First, the vehicle propeller shaft is balanced to a predetermined residual imbalance having an imbalance vector angle of 0° or 180° which lies inline with open set of cardan joint trunnions. The corrected residual imbalance is then visually marked. Next, the input shaft is balanced to a predetermined residual imbalance having an imbalance vector angle of 0° or 180° which lies inline with cross-holes in yoke ears. Again, the corrected residual imbalance on the input shaft is then visually marked. During the assembly of the vehicle, the assembly line operator couples the propeller shaft to the input shaft through a cardan joint cross by aligning the marks on the propeller shaft and the input shaft so that the marks are located opposite to each other.

6 Claims, 2 Drawing Sheets

SYSTEM AND METHOD FOR BALANCING A DRIVELINE SYSTEM

FIELD OF THE INVENTION

The invention provides a system and method for improving the vibrational characteristics of a vehicle drive train system or similar rotating shaft components connected through a universal joint.

DESCRIPTION OF RELATED ART

Most vehicles provide a drive train system for transmitting power from a source of rotational power, such as an internal combustion or diesel engine, to a plurality of rotatably driven wheels. A typical drive train system includes a clutch, a transmission, a drive shaft, and an axle connected between the engine and the driven wheels. The clutch is connected to the engine for selectively providing a driving connection therethrough to the transmission. The transmission provides a plurality of speed change gear ratios between the clutch and the drive shaft. The drive shaft is elongated so as to transmit the rotational power from the transmission to the vicinity of the driven wheels. The axle includes an elongated input shaft which is connected to the drive shaft, a differential which is rotatably driven by the input shaft, and a pair of output axle shafts which connect the differential to the driven wheels. All of the connections between the components of the drive train are typically accomplished by universal joints or similar couplings which permit the two components to be oriented at varying angles relative to one another during use.

A typical drive shaft may be formed from an elongated cylindrical tube having a pair of universal joints secured to the ends thereof. Alternatively, a drive shaft may be formed from two (or more) elongated cylindrical tubes which are connected together by universal joints, and which further including a pair of universal joints secured to the ends thereof. As used herein, the term "drive shaft" includes the overall assembly of both the tube (or tubes) and the universal joints secured thereto. Because of manufacturing inaccuracies, both the tubes and the universal joints are typically unbalanced for rotation. Thus, when the tubes and the universal joints are assembled, the drive shaft is generally also unbalanced for rotation. Similarly, the input shafts of the axles are also typically unbalanced for rotation during use.

It is well known that undesirable noises and vibrations are generated during use if the drive shaft and the axle input shaft are not precisely balanced for rotation. Thus, it is known to balance the drive shaft and the axle input shaft individually before installation into the vehicle drive train system. Many fixtures are known in the art for individually balancing these components. However, it has been found that when an individually balanced drive shaft and an individually balanced axle input shaft are connected together in the vehicle drive train system, the combined unit may be unbalanced for rotation. This occurs even though the drive shaft and the axle input shaft may have been carefully balanced individually before installation. The unbalance of the combined unit results from the summation of the smaller individual unbalances of the drive shaft and the axle input shaft when connected together.

There are two conventional types of attachments for a cardan universal joint to an axle; an end yoke or flange yoke with companion flanges. Both types of connections can be independently balanced at the drive shaft and at the pinion connection.

However, there is as much as 90 degrees of error on an end yoke style of connection and as much as 22.5 degrees of error on a flange yoke with companion flange style of connection. The degree of error occurs when the car or truck manufacturer offsets the unbalance at the assembly of the drive shaft to the axle. This error causes unbalance in the vehicle drive train system that is felt as a vibration to the driver.

Balance machines measure the amount of force created by the component or assembly being balanced. The balance machine then calculates the amount of weight needed to correct for this balance by knowing the speed of rotation of the balancer, correction radius and the angle of correction. These are all inputs into the system at setup of the equipment.

Once the component or assembly is balanced to a given requirement, it is typical of a customer to require a mark be placed on the drive shaft and/or pinion to indicate the leftover residual unbalance. The drive shaft and axle assemblies are shipped separately to the Original Equipment (OE) assembler for assembly into the vehicle structure. At assembly of the drive shaft to the axle pinion, the operator is instructed to clock the residual unbalance marks as best as possible to align the marks to each other, thus, negating the impact of the unbalance. End yokes have only two possible adjustments, 0 and 180 degrees, thus there could be as much as 90 degrees of error when trying to clock the residual unbalance. Flange yokes and companion flange connections have eight possible adjustments, every 45 degrees, thus there could be as much as 22.5 degrees of error when trying to clock the residual unbalance.

The need exists for a system and method to compensate for residual unbalance taking into account the potential degree of error caused by the structure of the conventional cardan universal joints; i.e., an end yoke or flange yoke with companion flange.

SUMMARY OF THE INVENTION

The invention would reduce this error in different styles of cardan universal joint shaft connections to an axle pinion.

This invention adjusts the residual unbalance so that it would be in one of the possible adjustment planes; i.e., 0 degrees or 180 degrees for the end yoke, and in one of the eight possible adjustments planes for the flange yoke and companion flange connection. Of course, the adjustment plane will be defined by the connection points for the universal joint.

The adjustment of this invention would be accomplished by initially measuring the balance of the drive shaft or axle assembly and then through an algorithm within the balancers electronics mathematically adjust the residual unbalance to a set value at a given orientation by an addition of balance weight at the calculated vector.

For an end yoke, the balancer would indicate to the operator the angle of correction through vector analysis and indicate the amount of weight to be added to shift the residual unbalance from, for example, 90 degrees to 0 or 180 degrees (i.e., inline with the open set of cardan joint trunnions). This corrected residual unbalance would be marked visually for the vehicle assembly operator's use. Similarly the axle would be balanced on the end yoke attached to the pinion to a residual unbalance. Again, through vector analysis the balancer would indicate to the operator the angle of correction and the amount of weight to be added to shift the residual unbalance from between the yoke ears to inline with the yoke ears (i.e., in line with the cross holes or half rounds). This corrected residual unbalance would be marked visually for the vehicle assembly operator's use. When the drive shaft is ready for assembly to the axle on the vehicle assembly line, the assembly operator aligns the marks, thus canceling out the residual unbalance and in effect creating a more refined drive system with reduced vibration.

For a flange yoke connection, the process would be substantially the same, but the relative angles for the residual imbalances would be different due to the different possible adjustment positions.

It is noted that software can be utilized to measure the unbalance and angle of either the drive shaft or axle pinion and compensate vectorially to a given angle plane and residual unbalance amount.

These and other benefits of this invention will become apparent with reference to the following drawings and associated description of the preferred embodiments.

DETAILED DESCRIPTION OF THE PREFERRED EMBODIMENT

Figure 1:
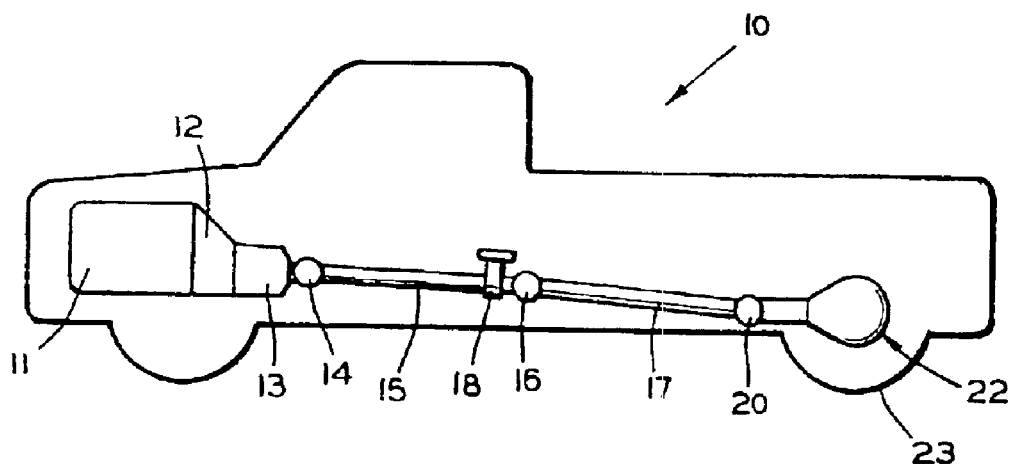
FIG. 1 is a side elevational view schematically illustrating a vehicle including a conventional drive train system.

Referring now to the drawings, there is schematically illustrated in FIG. 1 a vehicle, indicated generally at 10, including a conventional drive train system. The drive train system includes an engine 11, a clutch 12, and a transmission 13. As is well known, the engine 11 includes an output shaft (not shown) which is selectively connected through the clutch 12 to an input shaft (not shown) of the transmission 13. The transmission 13 provides a plurality of speed change gear ratios between the rotational speeds of the input shaft thereto and an output shaft (not shown).

The output shaft of the transmission 13 is connected by a first universal joint 14 to the forward end of a first drive shaft section 15. The rearward end of the first drive shaft section 15 is connected by a second universal joint 16 to the forward end of a second drive shaft section 17. A conventional center bearing assembly 18 is secured to the frame of the vehicle 10 for rotatably supporting the rearward end of the first drive shaft section 15 and, therefore, the forward end of the second drive shaft section 17.

The second drive shaft section 17 is connected by a third universal joint 20 to the forward end of a rotatable input shaft of an axle, indicated generally at 22. The axle 22 is conventional in the art and includes a differential (not shown) which is rotatably driven by the input shaft. The differential is connected to a pair of output axle shafts (not shown) which, in turn, are connected to respective driven wheels 23 (only one which is illustrated). As is well known, rotational power transmitted from the vehicle engine 11 by the drive shaft sections 15 and 17 to the differential is divided between the axle shafts to rotate the wheels 23 respectively connected thereto. As used herein, the term "drive shaft" refers to the combined assembly of the first universal joint 14, the first drive shaft section 15, the second universal joint 16, the second drive shaft section 17, and the third universal joint 20.

Figure 2:
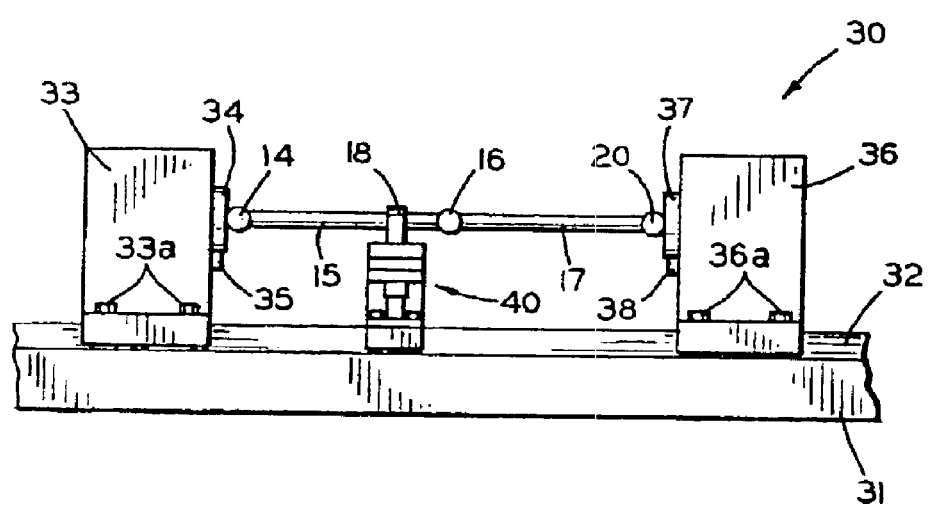
FIG. 2 is a side elevational view schematically illustrating a prior art apparatus for balancing portions of the vehicle drive train system shown in FIG. 1.

Referring now to FIG. 2, there is schematically illustrated a prior art apparatus, indicated generally at 30, for balancing the drive shaft. Such balancing is performed prior to installation of the assembly on the vehicle 10. The prior art balancing apparatus 30 includes a base 31 having a pair of elongated tracks 32 secured thereto. A first drive head 33 is mounted on the tracks 32 for sliding movement. Conventional means, such as threaded fasteners 33a, are provided for releasably securing the first drive head 33 in a desired position along the tracks 32 for use.

The first drive head 33 is conventional in the art and includes a variable speed electric motor (not shown). The output shaft of the electric motor is connected to a yoke 34. As shown in FIG. 2, the yoke 34 is adapted to be connected to bearings (not shown) carried on a cross supported on a corresponding yoke portion of the first universal joint 14 mounted on the forward end of the first drive shaft section 15. Thus, it can be seen that the forward end of the first drive shaft section 15 is supported to be rotatably driven by the electric motor in the first drive head 33 when it is energized. The first drive head 33 further includes a vibration sensor 35 mounted thereon. The sensor 35 is conventional in the art and is adapted to generate an electrical signal which is representative of the magnitude of the vibrations induced in the first drive shaft section 15 when rotated.

The prior art balancing apparatus 30 further includes a conventional second drive head 36 including a variable speed electric motor (not shown). The second drive head 36 is also mounted upon the tracks 32 for sliding movement. As with the first drive head 33, conventional means, such as threaded fasteners 36a, are provided for releasably securing the second drive head 36 in a desired position along the tracks 32 for use. Thus, the first drive head 33 and the second drive head 36 can be spaced apart from one another by any desired distance. As will become apparent below, this structure is provided to accommodate varying lengths of the first and second drive shaft sections 15 and 17.

The second drive head 36 supports a yoke 37 for rotational movement. As shown in FIG. 2, the yoke 37 is adapted to be connected to bearings (not shown) carried on a cross supported on a corresponding yoke portion of the third universal joint 20 mounted on the rearward end of the second drive shaft section 17. Thus, it can be seen that the rearward end of the second drive shaft section 17 is supported to be rotatably driven when the electric motor in the second drive head 36 is energized. The second drive head 36 further includes a vibration sensor 38 mounted thereon. The sensor 38 is conventional in the art and is adapted to generate an electrical signal which is representative of the magnitude of the vibrations induced in the second drive shaft section 17 when rotated.

In accordance with this invention, the residual imbalance is adjusted to be located in one of possible adjustment planes defined by the cross-shaped connection points for a conventional universal joint; e.g., 0 degrees or 180 degrees for the end yoke, and in one of the eight possible adjustments planes for the flange yoke and companion flange connection for a conventional flange yoke.

Figure 3:
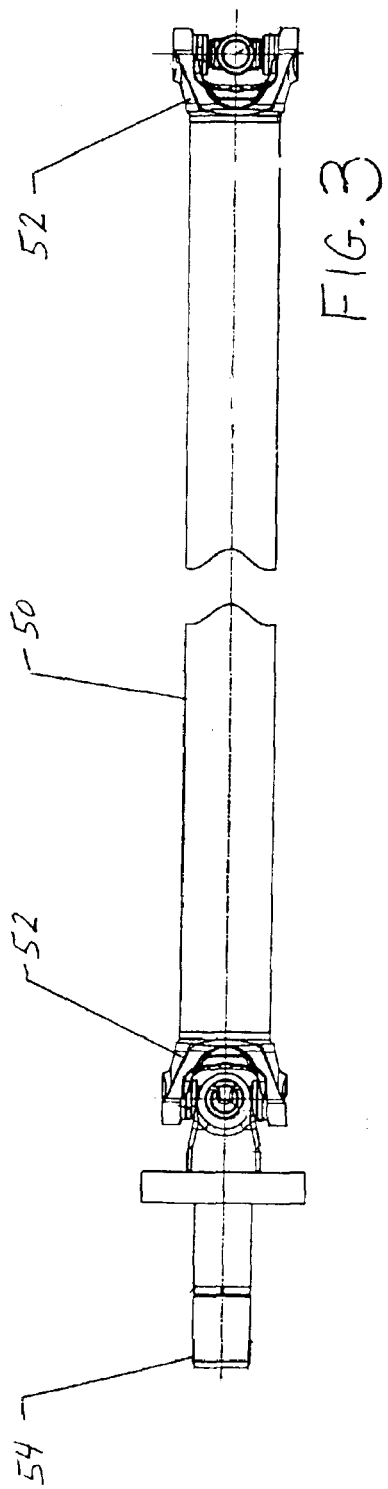
FIG. 3 is a side view of an adaptive driveshaft assembly.

FIG. 3 illustrates one type of adaptive driveshaft assembly including a tube 50 having a tube yoke 52 at each end thereof with the tube yoke 52 forms a part of a cardan universal joint including a conventional bearing assembly and cross member. A slip yoke assembly 54 is interconnected at one end of the tube 50 through the universal joint.

Figure 4:
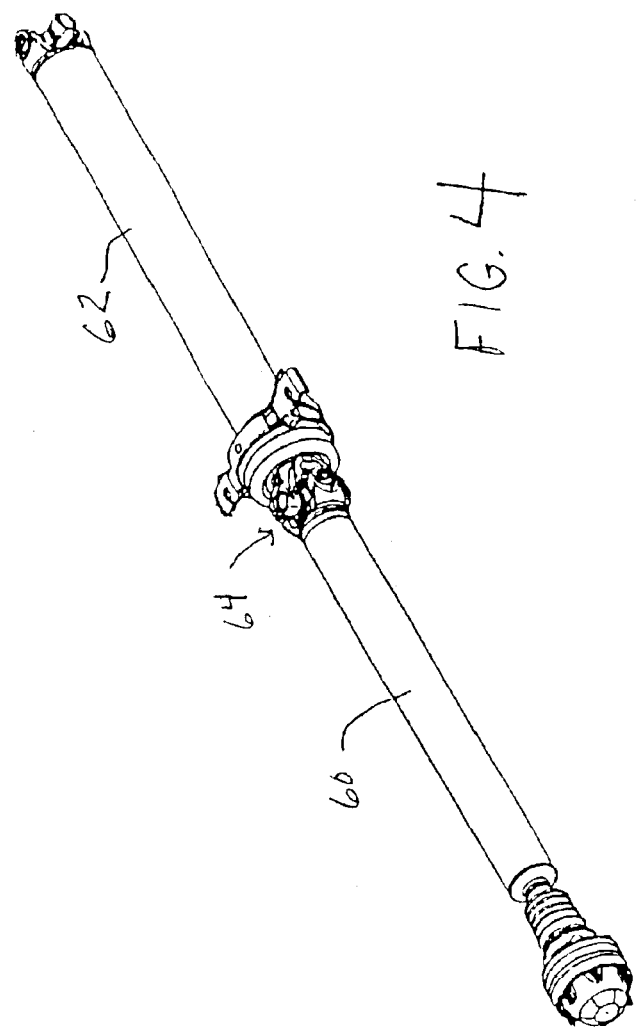
FIG. 4 is a perspective view of a three-joint drive shaft assembly.

FIG. 4 also shows a three-joint drive shaft assembly including an axle 60 and driveshaft 62 interconnected through a cardan universal joint 64.

The adjustment of this invention would be accomplished by initially measuring the balance of the drive shaft or axle assembly and then through an algorithm within the balancer's electronics, the invention mathematically adjusts the residual unbalance to a set value at a given orientation by an addition of a balance weight at the predetermined or calculated vector.

Through vector analysis, the balancer would indicate to the operator the angle of correction and the amount of weight to be added to shift the residual unbalance from its natural position to 0 or 180 degrees (i.e., inline with the open set of cardan joint trunnions).

Next, the corrected residual imbalance is marked visually for the vehicle assembly operator's use.

Similarly the axle would be balanced on the end yoke to a residual unbalance. Again, through vector analysis the balancer indicates to the operator the angle of correction and the amount of weight to be added to shift the residual unbalance from between the yoke ears to inline with the yoke ears (i.e., in line with the cross holes or half rounds). This corrected residual unbalance is marked visually for the vehicle assembly operator's use. When the drive shaft is ready for assembly to the axle on the vehicle assembly line, the assembly operator aligns the marks, thus canceling out the corrected residual unbalance and in effect creating a more refined drive system with reduced vibration.

For example, a drive shaft with end yoke is balanced to a residual unbalance of about 0.50 ounce-inch. The residual unbalance was found to be at the 90-degree location on the drive shaft. Through vector analysis, the balancer indicates to the operator the angle of correction and the amount of weight to be added to shift the residual unbalance from 90 degrees to 0 or 180 degrees; i.e., inline with the open set of cardan joint yoke ears. This corrected residual unbalance is marked visually for the vehicle assembly operator's use. Similarly, the axle would be balanced on the end yoke to a residual unbalance of about 0.50 ounce inch. Also, if the residual unbalance falls 90 degrees between the yoke ears, then through vector analysis the balancer would indicate to the operator the angle of correction and the amount of weight to be added to shift the residual unbalance from between the yoke ears to inline with the yoke ears; i.e., in line with the cross holes or half rounds. This corrected residual unbalance is marked visually for the vehicle assembly operator's use.

It is noted that the procedure is usually to mark the axle at the point of maximum imbalance and the drive shaft at the point of minimum imbalance. Now, both components are ready for assembly. When the drive shaft is ready for assembly to the axle on the vehicle assembly line, the assembly operator aligns the marks, thus canceling out the 0.50 ounce inch residual unbalance and in effect creating a more refined drive system with reduced vibration.

The process of the present inventions substantially simplifies the process of balancing and assembling the vehicular driveline and improves vibration characteristics of the vehicle.

It is noted that software can be utilized to measure the unbalance and angle of either the drive shaft or axle pinion and compensate vectorially to a given angle plane and residual unbalance amount.

While the foregoing invention has been shown and described with reference to a preferred embodiment, it will be understood by those of skill in the art that various changes in form and detail may be made therein without departing from the spirit and scope of the present invention.

What is claimed is:

1. A method for balancing a driveline including a first shaft and a second shaft interconnected by a rotating joint, said method including the steps of:

balancing said first shaft to a first residual imbalance having a first imbalance vector;

adding a first weight to shift said first imbalance vector so as to be disposed in at least one predetermined adjustment plane;

balancing said second shaft to a second residual imbalance having second imbalance vector;

adding a second weight to shift said second imbalance vector so as to be disposed in said at least one predetermined adjustment plane;

assembling said driveline by connecting said first shaft to said second shaft through said rotating joint so that said first imbalance vector of said first shaft substantially offsets said second imbalance vector of said second shaft;

wherein said at least one predetermined adjustment plane is defined by connection points for an end yoke connection of one of said shafts.

2. The method according to claim 1, wherein said steps of balancing comprise purposefully creating said first and second predetermined residual imbalances.

3. The method according to claim 1, further comprising adding a mark indicative of a location of said first and second predetermined residual imbalances.

4. The method according to claim 3, further comprising adding a first mark to the first shaft at the point of maximum imbalance and adding a second mark to the second shaft at the point of minimum imbalance.

5. The method according to claim 4, first shaft is an axle and said second shaft is a drive shaft.

6. A method for balancing a driveline including a first shaft and a second shaft interconnected by a rotating joint, said method including the steps of:

balancing said first shaft to a first residual imbalance having a first imbalance vector;

adding a first weight to shift said first imbalance vector so as to be disposed in at least one predetermined adjustment plane;

balancing said second shaft to a second residual imbalance having second imbalance vector;

adding a second weight to shift said second imbalance vector so as to be disposed in said at least one predetermined adjustment plane;

assembling said driveline by connecting said first shaft to said second shaft through said rotating joint so that said first imbalance vector of said first shaft substantially offsets said second imbalance vector of said second shaft, wherein said at least one predetermined adjustment plane is defined by connection points for a flange yoke and companion flange connection.

* * * * *